United States Patent [19]
Godwin

[11] 3,821,476
[45] June 28, 1974

[54] DICTATING MACHINE-TELEPHONE CONNECTOR LINK

[76] Inventor: Truman D. Godwin, 3312 20th St., Lubbock, Tex. 79410

[22] Filed: July 28, 1972

[21] Appl. No.: 275,921

[52] U.S. Cl. .................... 179/6 R
[51] Int. Cl. .................... H04m 1/64
[58] Field of Search .................... 179/6 R; 333/32

[56] References Cited

UNITED STATES PATENTS

| | | | |
|---|---|---|---|
| 2,525,763 | 10/1950 | Beatty | 179/6 R |
| 2,530,075 | 7/1954 | Peterson | 179/6 R |
| 2,957,944 | 10/1960 | DeMonte | 333/32 |
| 3,467,781 | 9/1969 | Feat | 179/6 R |

FOREIGN PATENTS OR APPLICATIONS

| | | | |
|---|---|---|---|
| 732,129 | 9/1932 | France | 179/6 R |

OTHER PUBLICATIONS

G. E. Transistor Manual; p. 227; c 1969.

*Primary Examiner*—Bernard Konick
*Assistant Examiner*—Alan Faber

[57] ABSTRACT

A connector link for connecting virtually any type of dictating machine to a telephone system to record incoming calls. The connector link is contained in a single housing, has its own power supply, and has terminals to facilitate connecting the connector link between the telephone system and an incoming call sensing device, and the dictating machine, without the need for modification of the dictating machine, telephone system or call sensing device. The connector link employs normally open switches so arranged that the dictating machine can be used in its normal fashion for microphone type voice dictation except when there is an incoming call on the telephone lines. A switch for disabling the connector link enables rejecting all incoming calls so the dictating machine can be used for dictating only. The connector link can be used to particular advantage where the incoming call sensing device is a telephone company installed recorder-coupler.

7 Claims, 3 Drawing Figures

DICTATING MACHINE-TELEPHONE CONNECTOR LINK

This invention relates to a connector link for electrically connecting any type of dictating or recording machine to a telephone pursuant to an incoming telephone call to enable recording messages, instructions, or other data on the dictating machine at any time from a remote telephone.

More specifically, the invention relates to a self-connector link having terminals which permit connecting any type of dictating machine to a telephone in response to operation of a device such as a telephone company provided recorder coupler for sensing an incoming telephone call. The coupling apparatus is so arranged that the dictating machine or recording device can be used in its normal manner without interference from the coupler at any time except when the dictating machine is recording an incoming message. This permits normal recording on the dictating machine using the usual microphone without disconnecting the coupler. In addition, the telephone can be used normally for incoming calls, and hence, the expense of a special telephone line for recording only is avoided.

By virtue of this connecting link, any dictating machine can be readily connected to a telephone and any known incoming call sensing mechanism without modifying the internal circuitry of the dictating machine and enables recording of a message from any telephone regardless of its location. The connecting link so connects the telephone and dictating machine that the telephone can be used in its normal manner at any time without interference from the dictating machine or connecting link and the dictating machine can be used at any time for dictating using its normal microphone.

By virtue of the connector link of this invention, it is no longer necessary to purchase a separate dictating machine or one uniquely adapted for telephone recording. Instead, virtually any dictating machine can be used for telephone dictation without any modification to the internal circuitry of the dictating machine.

While there are known recorders in the prior art which can be connected directly to a telephone provided with a recorder coupler, such units have been quite expensive because the user must purchase not only the internal equipment of the recorder which makes the necessary connections to the telephone lines, but also the recorder itself since the switches and other electrical apparatus for connecting the recorder to the telephone are not available as a separate unit. In addition, it is beyond the capability of most users of such equipment to connect the necessary components to the dictating machine even if they were separately available.

An additional advantage of the connector link of this invention is its self-contained power supply which requires no batteries, is adapted to be plugged into any existing power supply line, and which provides for connecting virtually any dictating machine to a telephone via, for example, a telephone company provided recorder coupler regardless of the power requirements of the dictating machine, without danger of overloading the circuitry of the recorder coupler.

An additional feature of the connector link of this invention is the impedance matching network which matches the impedance of the recording circuit of the dictating machine with the impedance of the telephone lines. Without this impedance matching the voice recording is hoplessly garbled and unintelligible. Since the impedance of the recording circuit of different types of dictating machines will necessarily be different, the matching network is so arranged that it can readily be changed to correspond to that required for matching the impedance of the dictating machine. Under normal circumstances, the purchaser of the dictating link of this invention need only specify the dictating machine to be used and the impedance matching network provided with the apparatus will match that dictating machine. Advantageously, the coupling apparatus can also be provided with a plug which corresponds to the microphone plug of the dictating machine so the dictating machine can be connected to the coupling apparatus simply by inserting the plug into the socket of the dictating machine. The plug can be of the piggy-back type to enable simultaneously connecting both the coupling apparatus and a microphone to the dictating machine.

Numerous other features and advantages of the coupling apparatus of this invention will become apparent with reference to the accompanying drawings which form a part of this specification and in which.

Figures 1, 2, 3:
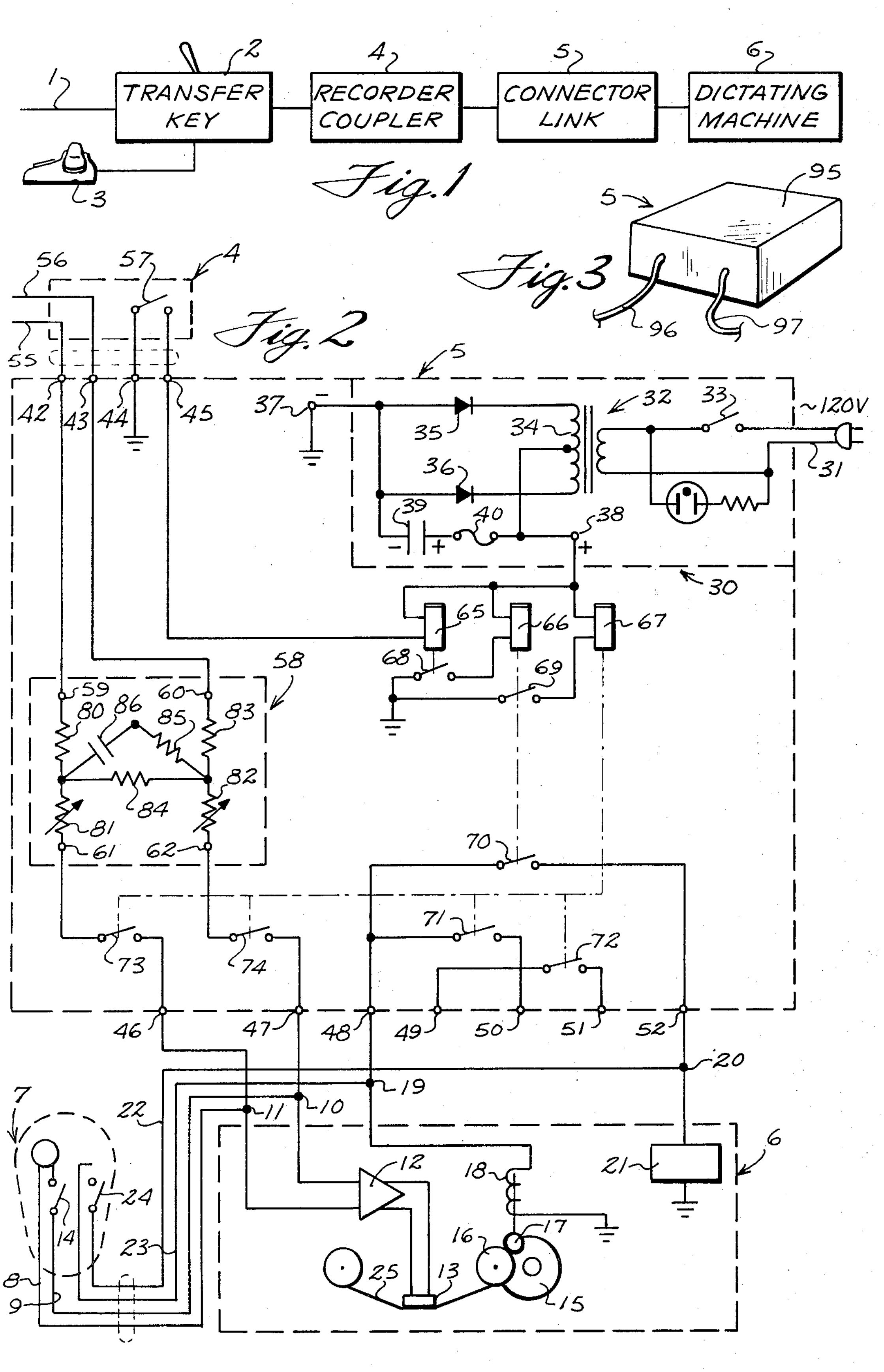
FIG. 1 is a block diagram showing the position of the connector link of this invention relative to the telephone system and dictating machine.
FIG. 2 is a schematic showing the circuitry of the connector link showing its circuitry and the manner in which the connector link is connected between the telephone and a dictating machine.
FIG. 3 is a pictorial view of the housing of the connector link.

As shown at FIG. 1, the system with which the connector link of this invention is used includes a telephone line 1, one end of which is connected to a transfer key 2 for selectively connecting the telephone line to a telephone 3 or to a recorder coupler 4 depending on the selected mode of operation of the system. A connector link 5 has its input connected to the recorder coupler and its output connected to a dictating machine 6.

Recorder coupler 4 forms no part of this invention and can be a Telephone Company provided recorder coupler type KS-19522 which is available on a rental basis from the Telephone Company. Alternatively, recorder coupler 4 can be any type of telephone answering device which closes at least one pair of contacts in response to an incoming ring signal at the input of the recorder coupler, and which has the effect of switching the telephone line from a ring mode to a transmit mode of operation, so long as the incoming call exists. The recorder coupler also automatically disconnects when the incoming caller terminates the telephone call by hanging up at the station from which he is making the call. At the same time, the switch in the recorder coupler which closed when the coupler answered the incoming call opens and the coupler becomes inactive.

The dictating machine 6 also forms no part of the present invention and can be any type of recording machine having a recording circuit via which information can be recorded on a movable recording medium and which includes a drive mechanism for moving the medium for recording information on the medium.

As shown at FIG. 2, the dictating machine 6 is shown schematically as having a dictating mecrophone 7 which is connected to the recording circuit of the dictating machine by wires 8 and 9 at the terminals 10 and 11. Terminals 10 and 11 within the dictating machine are connected to a suitable amplifier 12 which in turn is connected to a recording transducer, for example, a tape recording head 13. A suitable switch 14 is provided in line 9 to connect the microphone to the recording input terminals 10 and 11.

The dictating machine 6 also includes a tape drive mechanism including a motor 15 which is selectively clutched to a tape reel 16 via a clutch 17 which is electromagnetically operated by a solenoid 18. One side of solenoid 18 is connected to a drive mechanism input terminal 19 and the other side of the solenoid is electrically grounded to the dictating machine. A second recording mechanism terminal 20 is connected to the hot side of a grounded power supply 21 and wires 22 and 23 extend to the microphone 7. A switch 24, at the microphone is arranged to complete a circuit through wires 22 and 23 thereby energizing solenoid 18 and operating clutch 17 to cause reel 16 to rotate thereby moving tape 25 across recording head 13.

As shown at FIG. 2, connector link 5 includes a power supply 30 provided with a suitable plug 31 for connecction to an outlet of a power supply line. Power supply 30 includes a step down transformer 32 having a primary winding to which the wires from line cord 31 are connected respectively. Connected across the wires of the line cord is a pilot light including a neon bulb and resistor, and a power switch 33 is connected in series with one of the lines. The secondary 34 of the transformer is center tapped and has its ends connected respectively to rectifier diodes 35 and 36, such that terminal 37 of the power supply is negative. Positive terminal 38 of the power supply is connected to the negative terminal via a filter capacitor 39 and a fuse 40.

Connector link 5 has four input terminals 42–45. In addition, there are output terminals 46–52. As shown schematically at FIG. 2, input terminals 42 and 43 are connected respectively to telephone talk lines 55 and 56 of the recorder coupler. In addition, input terminals 44 and 45 are connected together via a normally open switch 57 within the recorder coupler and which is operated in the well known manner in response to an incoming call.

Connected to input terminals 42 and 43 is one side of an H-pad impedance matching network 58 having input connectors 59 and 60. The output connectors 61 and 62 of the impedance matching network 58 are connected respectively to output terminals 46 and 47 of the connector link.

Input terminal 45 is connected in series with a first relay 65 and power supply terminal 38. Also connected to the power supply terminal are the parallel connected relays 66 and 67. In the line between relay 66 and the electrical ground is a normally open relay contact 68 which is closed when relay coil 65 is energized. In the line between relay coil 67 and the electrical ground is a relay contact 69 which is normally open and is closed when relay coil 66 is energized.

Output terminals 48 and 52 are connected in series with relay contacts 70 which are normally open but which are closed when relay 66 is energized. Contacts 71, which are normally open, are connected in series between terminals 48 and 50 and contacts 72, which are normally open, are connected in series between output terminals 49 and 51. In addition, normally open contacts 73 and 74 are connected between output connectors 61 and 62 of the impedance matching terminals and output terminals 46 and 47 of the connector link. Contacts 71–74 are each normally open and are closed simultaneously when relay coil 67 is energized.

Output terminals 46 and 47 are connected respectively to the input terminals 10 and 11 of the recording circuit of dictating machine 6. Output terminals 48 and 52 are connected respectively to the input terminals 19 and 20 of the drive mechanism circuit for the dictating machine. Output terminals 49, 50, and 51 are provided to permit use of the connector link with dictating machines of different types which may include a central dictating arrangement where there are a plurality of microphones, in separate locations, each of which can be used separately for recording on the dictating machine. As is typical of such arrangements, there is usually a cradle for the microphone, and lifting the cradle activates a relay in the dictating machine to connect the dictating machine to that particular microphone so recording will commence when a dictate button on the microphone is depressed.

It is to be observed with particularity that whenever the recorder coupler 4 is unactivated and its switch 57 is open, all the switches 70-74 are open and there is no interference whatever with normal use of the dictating machine via microphone 7 and its switches 14 and 24. In this regard it will be further noted that the contacts 73 and 74 merely function to connect the talk lines of the telephone to the recording input circuit of the dictaphone at the terminals 10 and 11. In addition, contacts 70 are in effect paralleled across the contacts of switch 24 of the microphone and as a result, when contacts 70 are open the microphone can be used in its normal manner for dictating on the dictating machine.

OPERATION

In operation, dictating machine 6 is turned on so its drive motor is running and the machine is actuated to a dictate mode of operation by pressing a dictate mode button located either on the machine or on the microphone for the machine. Transfer key 2 is set to the record mode of operation so telephone 3 is temporarily disconnected, and switch 33 of the connector link 5 is turned on to energize the low voltage power supply 30. In response to an incoming call switch 57 of the recorder coupler 4 closes thereby connecting relay coil to the 40 volt low voltage power supply to energize the coil and close relay contacts 68. Closing of relay contacts 68 connects relay coil 66 across the low voltage power supply thereby closing relay contacts 69 and 70. Closing of relay contacts 69 connects relay coil 67 across the low voltage power supply thereby closing relay contacts 71–74.

When relay coil 66 is energized to close contacts 70 the solenoid 18 of the dictating machine is energized to clutch motor 15 to reel 16 to rotate the reel to move tape 25 across recording head 13. This is accomplished before contacts 71–74 close to connect the talk lines at terminals 46 and 47 to the input terminals 10 and 11 of the dictating machine. While there is only a momentary delay between the closing of contacts 70 and the contacts 73 and 74, such momentary delay is sufficient to move the tape 25 so recording can proceed immediately as soon as the switches 73 and 74 are closed. For dictating machines where it takes a second or so for the recording medium to reach a speed for proper recording, relay 67 can be a momentary time delay relay having a delay of 1 to 2 seconds before contacts 73 and 74 close.

While output terminals 49–51 are now shown connected to the dictating machine, these output terminals are used in the manner previously explained where there is a central dictating machine which serves several microphones.

A significant feature of the invention is that the connecting link 5 is entirely self-contained and is a unit completely separate and distinct from both the recorder coupler 4 and the dictating machine 6. Mounted on the same chassis as the impedance matching network 58 is the power supply 30 as well as the relays having coils 65–67 and associated contacts 68–74.

The input terminals 42–45 can be screw type terminals for connecting wires emminating from the recording coupler, or alternatively, can take the form of a suitable plug adapted to be plugged directly into recorder coupler 4.

Similarly, output terminals 46–52 can be connected in a common cable provided with a suitable plug adapted to be plugged into the microphone jack or input terminals of the dictating machine.

Advantageously, this output plug 76 can be a piggyback plug adapted to be plugged into the dictating machine input terminals and also having a receptacle to permit plugging the microphone for the dictating machine into the same plug. This provides for simultaneously connecting both the connector link and the microphone used for normal dictation to the dictating machine. Alternatively, output terminals 46–52 can be screw type terminals which are connected directly to the required inputs such as the terminals 10 and 11 and 19 and 20 of the dictating machine.

It is further contemplated that the impedance matching network 58 will necessarily have to be different for different dictating machines with different input impedances. For the dictating machine partly described herein which is a GRUNDIG STENORETTE the input impedance was found to be on the order of 50 ohms. In contrast, the telephone company system has talk lines with an impedance on the order of 600 ohms. The matching of the impedance of the recording circuit of the dictating machine to match the impedance of the telephone lines to the impedance of the dictating machine is accomplished with the H-pad impedance matching network which includes the resistors 80–85 and the compensating capacitor 86. If desired, resistors 81 and 82 can be variable resistors to permit varying the impedance of the pad 58 to match the input impedance of the dictating machine. Alternatively, the several components of the pad 58 can be mounted on a removable circuit board which can simply be plugged into the connectors 59–62. It is, of course, contemplated that the connector link of this invention will be used with numerous different types of dictating machines where the impedance of the dictating machines will be different. By providing the simplified arrangement for changing the impedance of the H-pad 58 a suitable H-pad with resistance values preselected can be substituted to accommodate the connector link for use with any type of dictating machine. Alternatively, resistors 81 and 82 can be adjustable whereupon the impedance at the terminals 61 and 62 can be changed to match the input impedance of the recording circuit of the dictating machine.

An arrangement of the type shown at FIG. 1 has proven to be satisfactory where an office or other establishment has several incoming lines which ring in sequence in response to someone dialing a single number at a remote location. In such an office with lines which ring in sequence where the lines have sequential telephone numbers, it is advantageous to connect the system shown at FIG. 1 to telephone line 1 which is the line that receives the last call when for example the other sequential ringing lines are busy. So connecting the arrangement assures that the dictating machine will not be turned sporadically by incoming calls from others. When someone knowing about the system wishes to dictate on dictating machine 6 he will dial the highest number of the sequential ring system so the last line is the one that rings, and since this line is the one that is connected to the system of FIG. 1, he will automatically be connected to dictating machine 6 which is started and connected to the telephone line for dictation in the manner previously described. Alternatively, the telephone line 1 can be the line for an unlisted or seldom used telephone number and can be used exclusively for incoming dictating as well as outgoing calls by appropriately positioning the transfer key.

When it is desired to completely disable the connector link 5 this is accomplished quite simply by opening the power line switch 33. With this switch open the dictating machine 6 can be used in its normal manner for microphone type dictation without any interruption as a result of an incoming call on telephone line 1 regardless of the position of transfer key 2. The fact that the switches 70–74 are all normally open and cannot close when power switch 33 is open provides for such exclusive dictation without the need for disturbing any of the wired connections between the connector link and the recorder coupler or dictating machine.

FIG. 3 shows a housing 95 for the components of connector link 5, and cables 96 and 97 extending from the housing 95. The cable 96 contains all the wires for connection to recorder coupler 4 and the cable 97 contains all the wires for connection to dictating machine 6. Where the cables 96 and 97 are used, the input terminals 42–45 and the output terminals 46–52 are of course at the wires at the outer ends of the respective cables 96 and 97.

While a preferred embodiment of the connector link of this invention has been shown and described, it is to be understood that numerous changes can be made, as specified herein, without departing from the scope of this invention as defined in the appended claims.

What is claimed is:

1. A connector link adapted to be connected between a dictating machine and a telephone and operable in response to the operation of an incoming call sensing device to automatically start the dictating machine and to automatically connect telephone talk lines to the machine to enable recording on the machine from any telephone at a remote location the connector link being especially adapted for use with any one of at least several different types of dictating machines each having different recording circuit impedances, without interfering with use of the selected dictating machine for normal microphone recording, and without modifying the dictating machine, the connector link comprising, in combination, first and second input terminals adapted to be readily connected to talk lines of a telephone;

third and fourth input terminals adapted to be readily connected to a device for sensing an incoming call on the telephone;

first and second output terminals adapted to be readily connected to the recording circuit of a dictating machine;

third and fourth output terminals adapted to be readily connected to a recording medium drive mechanism of the dictating machine;

readily changeable impedance matching means between said first and second input terminals and said first and second output terminals for matching the impedance of the telephone system to the impedance of the recording circuit of any one of at least several different types of dictating machines, each having different input impedances; means for electrically connecting said third output terminal to said fourth output terminal in response to operation of the sensing device to start the drive mechanism of the dictating machine, said means comprising a low voltage power supply energizable from a power line, first relay means connected to said power supply and energizable in response to operation of the sensing device, a first switch operated by said first relay means, second relay means connected to said power supply and energizable in response to operation of said first switch;

a second switch and a third switch operated by said second relay means;

means connecting said third switch to said third and fourth terminals;

third relay means connected to said power supply and energizable in response to operation of said second switch; and fourth switch means responsive to operation of said third relay means to electrically connect said first and second input terminals to said third and fourth output terminals thereby electrically connecting the talk lines from the telephone system to the recording circuit of the dictating machine;

at least said third switch and fourth switch means being normally open to enable use of the dictating machine for normally microphone recording without interference by the connector link;

said power supply, relay means impedance matching means, switches, and switch means all being mounted in a common housing separate from said dictating machine and telephone system.

2. Electrical apparatus according to claim 1 wherein said first relay means, second relay means, and third relay means are each relay coils;

said first switch means, second switch means, third switch means and fourth means are each relay contacts.

3. Apparatus according to claim 2 wherein said low voltage power supply is connected to said coils of said first, second, and third relay means to energize said relay means, whereby, the voltage and current carrying capacity of the incoming call sensing device is not exceeded regardless of the power requirements of the dictating machine.

4. Apparatus according to claim 3 wherein said low voltage power supply includes a step down transformer providing a voltage of approximately 40 volts; and switch means to selectively connect a primary winding of said transformer to a power supply line.

5. Electrical apparatus contained in a single housing and adapted to be connected between virtually any type of dictating machine and a telephone system, and operable in response to a ring sensing device connected to the telephone system to automatically start the dictating machine and connect the telephone talk lines to a recording circuit of the machine to enable recording on the machine from any telephone at a remote location, said apparatus permitting normal use of the dictating machine for recording when the apparatus is inactive, said apparatus comprising, in combination first and second input terminals adapted to be readily connected to talk lines of a telephone system;

third and fourth input terminals adapted to be readily connected to a device for sensing a ring signal on the telephone lines;

first and second output terminals adapted to be readily connected to a recording circuit of a dictating machine;

third and fourth output terminals adapted to be readily connected to the drive mechanism of the dictating machine;

readily changeable impedance matching means between said first and second input terminals and said first and second output terminals for matching the impedance of the telephone system to the impedance of the recording circuit any one of several dictating machine;

switch means between said first and second input terminals and said first and second output terminals said switch means being normally open;

switch means between said third and fourth output terminals, said switch means being normally open; and means responsive to the operation of said ring signal detecting means for closing said switch means to connect said first and second output terminals to the respective first and second input terminals to connect said telephone talk lines to the recording circuit of the dictating machine, and for connecting said third and fourth output terminals to start the drive mechanism of the dictating apparatus;

said normally open switch means isolating said dictating machine from the apparatus except when the apparatus is in operation; and manually operable means for selectively disabling said apparatus to maintain the switch means open and reject an incoming call.

6. Electrical apparatus according to claim 5 wherein the readily changeable impedance matching means include an H-pad including a pair of variable resistors for varying the impedance of the circuit connected to the recording circuit of the dictating machine.

7. Electrical apparatus according to claim 5 wherein said first, second, third, and fourth output terminals are terminals at the end of a cable connected to the electrical apparatus to facilitate connecting the apparatus to the dictating machine.

* * * * *